United States Patent
Leeuwangh

(12) 
(10) Patent No.: US 11,105,487 B2
(45) Date of Patent: Aug. 31, 2021

(54) OPTICAL ELEMENT FOR WIND TURBINE TOWER MARKING

(71) Applicant: Orga Holding B.V., Schiedam (NL)

(72) Inventor: Thomas Leeuwangh, Schiedam (NL)

(73) Assignee: ORGA HOLDING B.V., Schiedam (NL)

(*) Notice: Subject to any disclaimer, the term of this patent is extended or adjusted under 35 U.S.C. 154(b) by 0 days.

(21) Appl. No.: 16/627,400

(22) PCT Filed: Jun. 29, 2018

(86) PCT No.: PCT/NL2018/050422
§ 371 (c)(1),
(2) Date: Dec. 30, 2019

(87) PCT Pub. No.: WO2019/004832
PCT Pub. Date: Jan. 3, 2019

(65) Prior Publication Data
US 2020/0141558 A1    May 7, 2020

(30) Foreign Application Priority Data

Jun. 30, 2017 (NL) .................................... 2019157
Jan. 29, 2018 (NL) .................................... 2020343

(51) Int. Cl.
*F21V 5/04* (2006.01)
*F21S 8/02* (2006.01)
(Continued)

(52) U.S. Cl.
CPC .............. *F21V 5/045* (2013.01); *F21S 8/024* (2013.01); *G02B 6/0008* (2013.01); *F21W 2111/00* (2013.01); *F21Y 2115/10* (2016.08)

(58) Field of Classification Search
CPC ................................. F21V 5/045; F21S 8/024
(Continued)

(56) References Cited

U.S. PATENT DOCUMENTS 10,132,988 B2 * 11/2018 York .................... G02B 6/0073
2004/0012976 A1 * 1/2004 Amano .................. F21S 43/14
362/511
(Continued)

FOREIGN PATENT DOCUMENTS

DE         676166 C     5/1939
DE      9421685 U1     3/1997
(Continued)

OTHER PUBLICATIONS

International Search Report dated Oct. 17, 2018 issued in corresponding Netherlands Application No. 2020343 (12 pgs.).
(Continued)

*Primary Examiner* — Bryon T Gyllstrom
*Assistant Examiner* — Christopher E Dunay
(74) *Attorney, Agent, or Firm* — Pillsbury Winthrop Shaw Pittman, LLP

(57) ABSTRACT

A light entry part (2) for receiving light from at least one light emitting element (13) and having a central axis (6a) —a light exit part (3) for outputting light having a central axis (6b) —a longitudinally extending light transmitting part (5) having a longitudinal axis (6c), wherein the light transmitting part extends between the light entry part and the light exit part, such that the central axes of the light entry part and of the light exit part coincide with the longitudinal axis of the light transmitting part; wherein the light transmitting part is at one side configured for optical connection with the light entry part and at an opposite side configured to be in optical connection with the light exit part. The light exit part comprises a central lens (7a) and two side reflectors (a, 8b).

24 Claims, 4 Drawing Sheets

Figure 3:
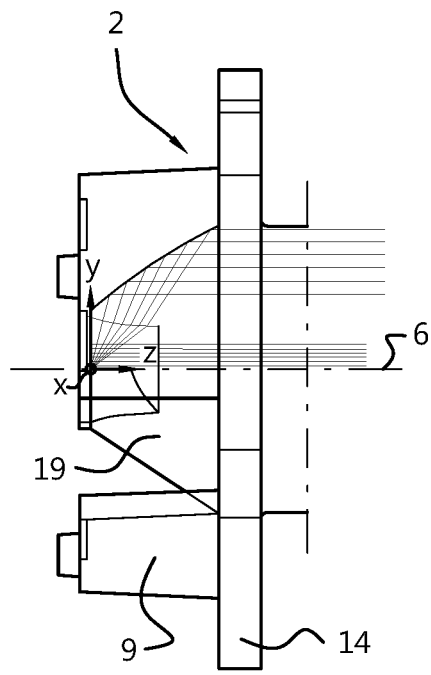

(51) Int. Cl.
*F21V 8/00* (2006.01)
*F21Y 115/10* (2016.01)
*F21W 111/00* (2006.01)

(58) Field of Classification Search
USPC .......................................................... 362/470
See application file for complete search history.

(56) References Cited

U.S. PATENT DOCUMENTS

| | | | |
|---|---|---|---|
| 2004/0208019 A1* | 10/2004 | Koizumi | G02B 6/0006 362/545 |
| 2007/0019429 A1* | 1/2007 | Gasquet | F21V 5/045 362/510 |
| 2012/0236586 A1* | 9/2012 | Wang | F21V 5/00 362/555 |
| 2014/0192558 A1* | 7/2014 | Dau | F21V 7/00 362/612 |
| 2018/0274742 A1* | 9/2018 | Zhang | F21S 8/024 |

FOREIGN PATENT DOCUMENTS

| | | |
|---|---|---|
| EP | 1544460 A2 | 6/2005 |
| EP | 2908007 A1 | 8/2015 |
| GB | 2372091 A | 8/2002 |
| WO | 2006/077084 A1 | 7/2006 |
| WO | 2018/183254 A1 | 10/2018 |

OTHER PUBLICATIONS

International Search Report dated Oct. 17, 2018 issued in corresponding International Patent Application No. PCT/NL2018/050422 (6 pgs.).

Written Opinion of the International Searching Authority dated Oct. 17, 2018 issued in corresponding International Patent Application No. PCT/NL2018/050422 (7 pgs.).

* cited by examiner

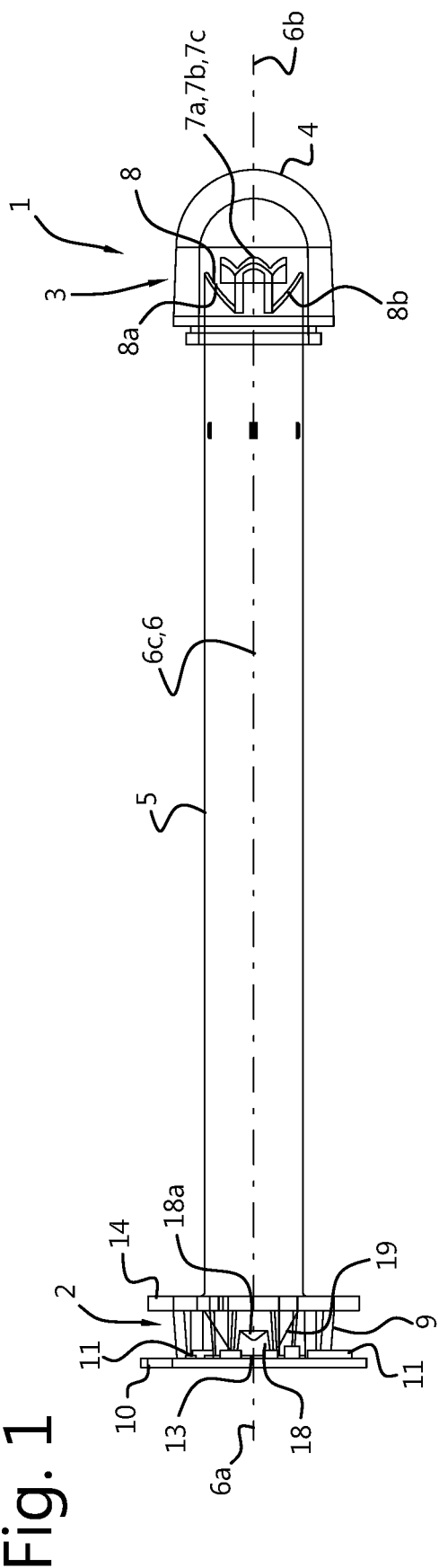
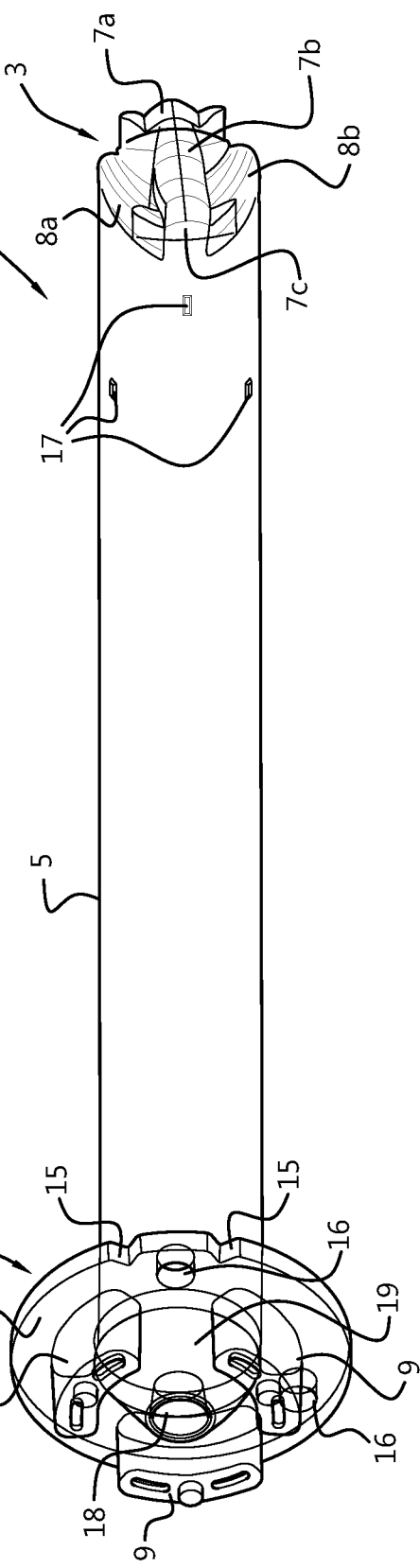

OPTICAL ELEMENT FOR WIND TURBINE TOWER MARKING

CROSS-REFERENCE TO RELATED APPLICATIONS

This application claims priority to PCT/NL2018/050422, filed Jun. 29, 2018, which in turn claims priority to NL 2019157 filed Jun. 30, 2017, and NL 2020343, filed Jan. 29, 2018, all contents of each of which are hereby incorporated by reference in their entireties.

The invention relates to an optical element, in particular to an optical element arranged for insertion in an opening in a wind turbine tower wall for marking the tower of the wind turbine.

Wind turbines, both offshore and onshore, are increasing in size and/or weight. The turbine towers, supporting the nacelle and the blades, thus become larger as well. In particular, the height of the turbine towers is increasing. It is known to provide obstacle marking lights onto the wind turbine tower to provide navigation aid for aeronautical vehicles or marine vessels. Also, it is known to provide obstacle marking onto the tower of the wind turbine, in particular for wind turbines of a certain height and higher.

Various solutions have been proposed to provide tower marking lights to the tower of the wind turbine. It is known to mount marking lights at the outside of the tower. As the installation is done completely at the outside of the wind turbine tower, the tower strength and stiffness is not affected. A drawback of this solution is that the tower lights are difficult to access, in case of failure or maintenance, as the tower lights are in fact only reachable by a crane or via abseiling or climbing along the tower wall. In particular for wind turbine towers offshore, providing a crane alongside the wind turbine tower or providing a specialized high altitude climber who mounts alongside the tower is considered dangerous and preferably avoided.

So, solutions have been developed to alleviate this problem. One approach that has been developed is to insert a tower light through a hole in the tower wall of the wind turbine. This provides for easy accessibility of at least part of the tower light. However, then, a hole in the tower wall needs to be made, which may be disadvantageous for the strength and/or stiffness of the tower wall. Also, certification of such a tower wall with such openings may be difficult or at least may impose more efforts to comply. For example, patent publications EP1842004 and EP 2908007 describe a tower light to be inserted through a hole in the tower wall. However, these solutions are rather bulky, requiring a relatively large hole in the tower wall, which may compromise the strength of the tower wall or requires reinforcements or other measures to compensate therefor. Also, it proved difficult to align the light fixture due to the length of the light fixture and the insertion from the inside as to obtain the desired light emitting pattern. Also, EP 1544460 proposes a solution in which a light source of a light fixture is installed inside the tower, and fiber optic cables are connecting to the light source, inside the tower, to light distributing members on the outside of the tower wall. However, obtaining a required light emitting pattern is difficult due to the random light distribution exiting from the fiber optic cable, as well as due to positioning of the light distributing member at the outside of the tower wall, where it is practically inaccessible.

So, there is a need to provide a solution for marking a tower wall of a wind turbine that obviates at least one of the above mentioned drawbacks, while maintaining at least one of the advantages. Preferably, a solution is provided that allows relative easy installation and alignment, and can be operated reliably at relatively low cost, while limiting the adverse effects on the strength of the tower wall.

Thereto, the invention provides an optical element, the optical element comprising a light entry part for receiving light from at least one light emitting element and having a central axis; a light exit part for outputting light having a central axis; a longitudinally extending light transmitting part having a longitudinal axis, wherein the light transmitting part extends between the light entry part and the light exit part, such that the central axes of the light entry part and of the light exit part coincide with the longitudinal axis of the light transmitting part; wherein the light transmitting part is at one side configured for optical connection with the light entry part and at an opposite side configured to be in optical connection with the light exit part; wherein the light exit part comprises a at least one lens to mainly output the light along a direction of the central axis and at least two reflecting surfaces to mainly output the light sideways in a direction transverse to a plane including the central axis, wherein the reflecting surfaces are arranged on either side of the plane and with the at least one lens arranged in between the at least two reflecting surfaces. Preferably, the light rays propagate through the light transmitting part substantially in a direction along the longitudinal axis. Further, the light transmitting part provides total internal reflection to reflect light rays that impinge on side walls of the light transmitting part, as to reduce loss of light and/or intensity. The optical element is considered to be the element through which the light rays, emitted by a light emitting element, propagate. The light entry part is positioned at a distance from the light exit part with the light transmitting part in between, with optical connections in between.

By providing an optical element of which the light entry part, the light transmitting part and the light exit part are in line with each other, and of which the light entry part is at a distance of the light exit part, the optical element can be inserted in a hole in a wind turbine wall. This allows for easy installation and maintenance. Also, since the light emitting elements are then arranged with the light entry part at one side of the optical element, adjustment of the optical element to align to the desired light emitting pattern becomes more easy. Further, by first providing a light entry part that is arranged for directing the light emitted from the at least one light emitting element towards a direction along the central axis, the light distribution of the light entering the light transmitting element may become more optimal. As such, the light transmitting part may become relatively small in cross-section allowing to provide a relatively small hole in the wind turbine tower. For example, a hole of about 1 cm to about 3 cm of diameter may suffice to receive the optical element. For such a hole, usually no additional reinforcements are needed. Also, holes with such a limited diameter are understood not or only in a limited way to compromise the strength of the wind turbine tower wall. Moreover, usually only three or four such holes may be provided over the circumference of the tower wall. The light transmitting part can be relatively long, for example between approximately 2 cm and approximately 40 cm.

Furthermore, the light exit part is configured to provide for a desired light output pattern. By providing at least one lens and at least two reflecting surfaces, the desired light output pattern can be obtained with light that has been transmitted over a considerable length through the light transmitting part which may have led to some randomization of the light nevertheless. So, a compact and efficient optical element is obtained that can be inserted, at least partly, in a hole of the wind turbine wall.

Advantageously, the light entry part may comprise a collimator arranged as a body of revolution around the central axis. By providing a collimator, the light entering the light entry part from the at least one light emitting element is being directed as much as possible into the direction of the longitudinal axis of the light transmitting part. As such, the light entering the light transmitting part is preferably as optimal as possible. The collimator advantageously uses total internal reflection to reflect and/or direct the light towards the direction of the longitudinal axis. Using such a collimator is advantageous, as the light emitted by the at least one light emitting element is usually emitted in an approximately hemispherical distribution. The light emitted by the light emitting element or light emitting elements enters the light entry part with such a relatively wide distribution. Providing the collimator thus allows for more directing the emitted light towards a direction along the central axis.

By providing the light entry part with a recess for housing the at least one light emitting element, the recess can form a light entry surface for receiving light emitted by the at least one light emitting element. As such, as much emitted light as possible enters the light entry part to optimize the efficiency of the optical element to provide as much light output as possible with the light emitted by the at least one light emitting element. Thus, a relatively efficient optical element is obtained.

Advantageously, the light transmitting part may be axisymmetric with respect to the longitudinal axis, preferably the light transmitting part is tubular. By providing an axisymmetric, preferably tubular, light transmitting part, an effective optical element can be obtained that can be inserted relatively easy in an opening of a wind turbine wall and that provides a relatively optimal optical performance. The light transmitting part can e.g. be a polygonal prism, or a cylinder, allowing relative easy inserting through the hole. By providing a light transmitting part with such a relatively optimal optical performance, the cross-sectional size, e.g. the diameter, of the light transmitting part can be relatively limited, such that the opening in the wind turbine tower wall can be limited in diameter.

Advantageously, the light transmitting part can be a solid body using total internal reflection for transmitting the light towards the light exit part. So, optimal use can be made from the optical characteristics of the light transmitting part to improve the optical efficiency and performance of the optical element.

More advantageously, the plane including the central axis can be a symmetry plane, with respect to which the at least two reflecting surfaces are arranged symmetrically, and which symmetry plane is, in use, a substantially vertical plane. As a consequence, the direction of the light outputted by the at least two reflecting surfaces is a substantially horizontal direction in use. The for example parabolic reflecting surfaces are preferably arranged to direct the light output mainly sideways to finally obtain the total desired horizontal beam spread. Also, the parabolic reflecting surfaces may be configured to output the light within a predefined vertical beam spread as to minimize the diffused light.

More advantageously, by configuring the light exit part to output light in a predefined pattern symmetric with respect to the plane including the central axis, preferably with respect to the symmetry plane, the light output pattern can be predefined to comply with national and/or international rules and/or regulations. It is thus sufficient to provide the optical element to obtain the desired light output pattern. As often the desired or required light output pattern, in use, has a relatively wide horizontal spread, between approximately 90 degrees to approximately 200 degrees and has a relatively small vertical beam spread. This vertical beam spread is usually defined by regulations, and can be between approximately 0.1 degrees and approximately 15 degrees, preferably around approximately 12 degrees. To comply with such a predefined pattern, it is advantageous to emit the light symmetrically with respect to a vertical plane, i.e. the symmetry plane.

Advantageously, a main optical axis of at least two lenses are arranged in the symmetry plane. The light exit part may for example comprise an array of lenses, the main optical axis of each lens of said array of lenses being substantially parallel to each other and being included in the symmetry plane. The lenses are preferably arranged to direct a central portion of the light in a direction along the longitudinal axis to create a beam with a horizontal beam spread of about 60 degrees to about 100 degrees, preferably symmetrically with respect to the symmetry plane. The lenses may thus provide for a portion of the total horizontal beam spread of the optic. The reflecting surfaces may comprise for another portion of the total horizontal beam spread of the optical element, such that the lenses and the reflecting surfaces together provide for the required horizontal beam spread of the optic, of about 90 degrees to approximately 200 degrees of the optical element. Also, the lenses can direct the output light in a vertical beam spread as well. The lenses can output a different, a same or a similar output pattern, depending on the total required output pattern, e.g. horizontal beam spread and/or vertical beam spread.

The light exit part can comprise a matrix pattern of lenses and/or reflecting surfaces arranged symmetrically with respect to the plane including the central axis, preferably with respect to the symmetry plane, which in use is a vertical plane. As such, each lens and/or reflecting surface of the pattern of lenses and/or reflecting surfaces may have its specific light output characteristics to direct the light more sideways, or upwards or downwards, depending on the desired light output pattern.

Also, some positions in the matrix pattern may be left empty, or may preferably be filled with reflecting surfaces if design shows that fewer lenses than available positions are sufficient to provide the required light output pattern. Thus, the matrix pattern may comprise n positions, of which m positions are filled with a lens, wherein m<n, such that the pattern of filled positions is symmetric with respect to the symmetry plane. For example, in an embodiment, a matrix pattern of 3×3 having nine positions may be provided for the light exit part. To finally obtain the desired light output pattern, it may appear to be sufficient to use seven of the nine positions for lenses, so two positions of the matrix pattern can be then filled by reflecting surfaces, preferably one position at either side of the symmetry plane. This is just an example, it may be understood that other matrix patterns, or other positions may be possible as well. As a further example, the smallest possible matrix in the framework of the invention is a 3×1 matrix, including one row and three columns, in which the central element is a lens, which is flanked by two reflecting surfaces. As such, a flexible way of designing the light exit part is provided which allows flexibility in adapting the light exit part to different rules and/or regulations.

In an advantageous embodiment, the lenses of the light exit part can form an end of the optical element, whereas the parabolic reflecting surfaces are positioned deeper than the lenses. As such, the lenses are optimally positioned to output the light centrally, while the reflecting surfaces are optimally positioned to output the light more sidewards to obtain at least a total desired horizontal beam spread.

The optical element may further comprise a transparent dome configured to be mounted over the light exit part. Such a transparent dome may protect the optical element against environmental influences, dirt, bird waste etc.

Advantageously, the optical element is manufactured as a single piece by means of injection molding, or the optical element can be manufactured in at least two pieces by means of injection molding, which are optically connected to each other. Preferably, the optical element is manufactured as a single piece, as this is advantageous and avoids optical refraction due to the connection surfaces. However, injection moulding of such relatively solid pieces may be difficult, and thus, it may sometimes be that the optical element may have to be injection moulded in two or more pieces. Preferably, these pieces may then glued together at their engaging surfaces, such that optical refraction due to these surfaces, may be minimal. The pieces may also be connected in another way, for example by welding, in particular ultrasonic welding, or by clamping, or in still another way. Alternatively, the at least two pieces may be kept at a distance of each other, without direct connection, so that there is an air layer in between the at least two pieces. As the refraction index of air is known, the influence of the air on the light propagation may be taken into account. This can provide a better correction of irregularities, which may especially appear in a connecting material such as glue or welding.

Advantageously, the light entry part comprises mounting elements for mounting the optical element to a mounting fixture. As such, easy connection of the optical element to the mounting fixture is possible. For example, the mounting element may be a ring or a flange surrounding the light entry part that may fit into a groove of the mounting fixture. In another embodiment, the mounting element may be a flange having a hole that fits to e.g. a finger or other corresponding element of the mounting fixture. Many variants are possible.

More advantageously, the light entry part comprises positioning elements for fixating the at least one light emitting element with respect to the optical element. The at least one light emitting element may be an LED positioned on a printed circuit board as mounting plate. The printed circuit board may comprise cooperating elements that cooperate with the positioning elements as to precisely position and align the light emitting elements with respect to the light entry part. As such, the at least one light emitting element is optimally aligned with respect to the light entry part. In particular, when a single light emitting element is provided, preferably a central light emitting axis of the light emitting element coincides with the central axis of the light entry part, and thus with the longitudinal axis of the optical element. As such, the optical element together with the mounting plate of the at least one light emitting element can form a firmly connected unit that allows easy alignment. The positioning elements may for example be protrusions that fit in recesses on the mounting plate of the light emitting element(s), or may otherwise include elements that allow for positioning of the optical element, in particular of the light entry part with respect to the mounting plate.

The mounting elements and/or the positioning elements are preferably injection moulded together with the optical element, to allow more easy manufacturing and reduce possible misalignment or other mistakes when adding the fixation and/or mounting elements later to the optical element.

There may be provided a single light emitting element of which a central light emitting axis, after connection to the optical element, coincides with the central axis of the light entry part, and, thus of the optical element. A single light emitting element may be sufficient for low intensity obstacle marking lights. For medium or high intensity applications, more light emitting elements may be required to provided the desired light intensity output. There may also be provided multiple light emitting elements that may be positioned in an array, a matrix or any other pattern onto the mounting plate and with respect to the light entry part. For example, in addition to a main white light emitting element centrally positioned, there may for example be provided an array or a circle of red, or infrared, light emitting elements. For these light emitting elements the central light emitting axis does not coincide with the central axis of the light entry part, but due to the positioning of the light emitting elements, preferably, in a recess of the light entry part and/or the shape of the light entry surface, the light emitted by these light emitting elements may be optimally used.

In an embodiment, the mounting elements and the positioning elements may be combined to reduce size and/or number of components of the optical element.

Further advantageous embodiments are represented in the subclaims.

Figure 4A:
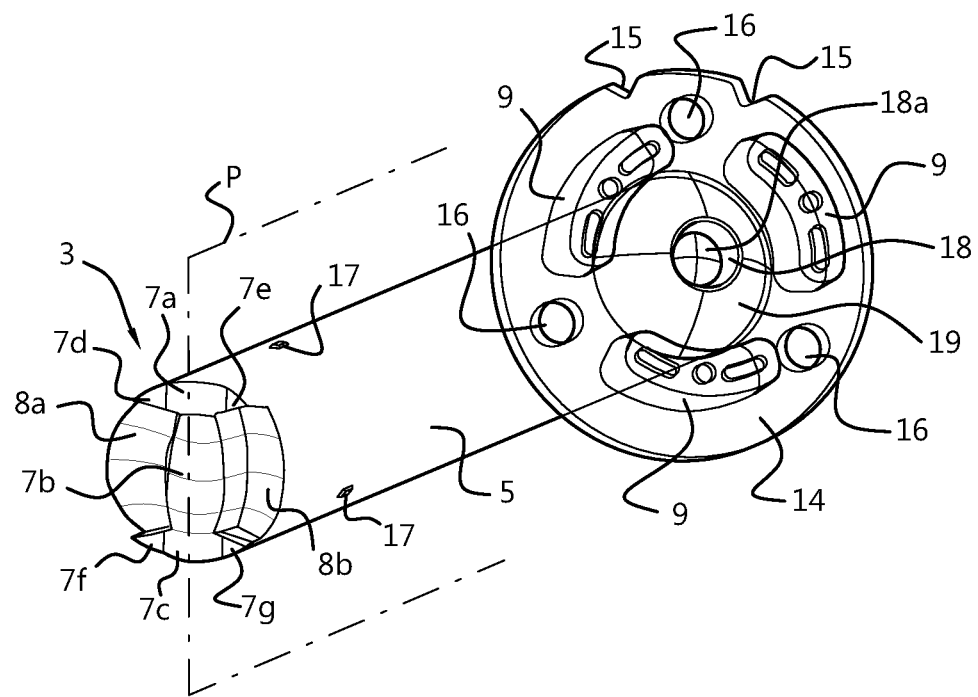
Figure 4B:
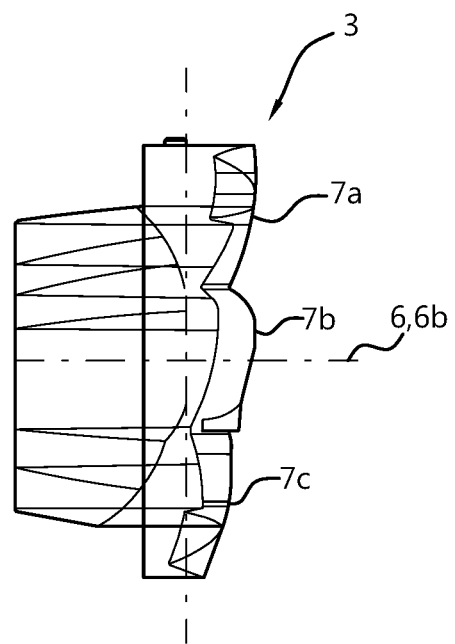
Figure 4C:
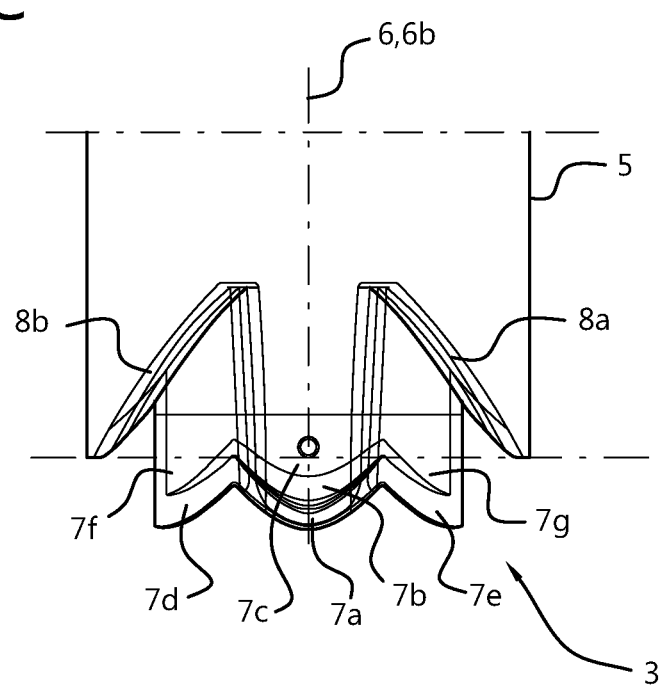
Figure 5:
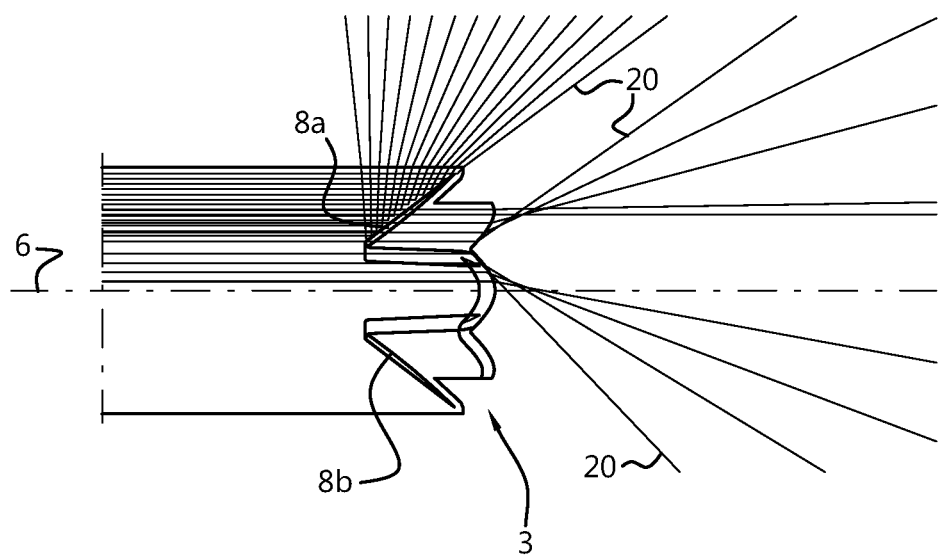
Figure 6:
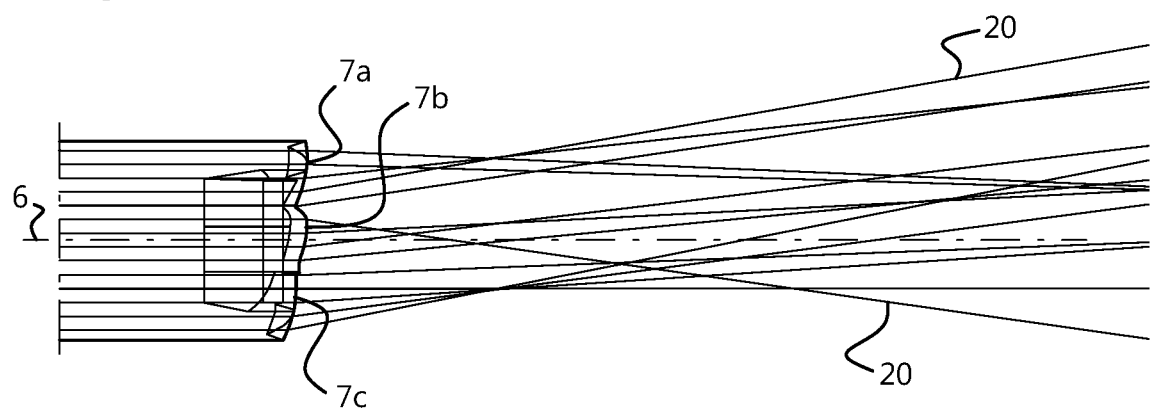

The disclosure will further be elucidated on the basis of exemplary embodiments given by way of non-limitative description and illustration. Embodiments according to the disclosure will, by way of non-limiting example be described in detail with reference to the accompanying drawing. In the drawing shows FIG. 1 a schematic bottom view of an embodiment of an optical element according to the invention, having a dome;

FIG. 2 a perspective bottom view of the optical element of FIG. 1 without a dome;

FIG. 3 a schematic representation of light rays in the light entry part of the optical element of FIG. 1;

FIG. 4a a perspective front view of the light exit part of the optical element of FIG. 1;

FIG. 4b a schematic side view of the light exit part of the optical element of FIG. 1;

FIG. 4c a schematic top view of the light exit part of the optical element of FIG. 1;

FIG. 5 a schematic representation in top view of light rays in the light exit part;

FIG. 6 a schematic representation in side view of light rays in the light exit part.

It is noted that the figures are only schematic representations of embodiments of the disclosure that are given by way of non-limiting example. Various modifications, variations, and alternatives are possible, as well as various combinations of the features described. The specifications, drawings and examples are, accordingly, to be regarded in an illustrative sense rather than in a restrictive sense. Corresponding parts are denoted by the same or corresponding reference numbers.

FIG. 1 shows a schematic bottom view of an optical element 1 according to the invention. The optical element 1 comprises a light entry part 2 for receiving light from at least one light emitting element 13 and having a central axis 6a, and a light exit part 3 for outputting light having a central axis 6b. A transparent dome 4 may be mounted over the light exit part 3. Such a transparent dome 4 may protect the optical element against environmental influences, dirt, bird waste etc. Advantageously, the transparent dome 4 may be arranged to protect the optical element 1. The optical element 1 further comprises a longitudinally extending light transmitting part 5 having a longitudinal axis 6c, wherein the light transmitting part 5 extends between the light entry part 2 and the light exit part 3, such that the central axes 6a, 6b of the light entry part 2 and of the light exit part 3 coincide with the longitudinal axis 6c of the light transmitting part 5. The light transmitting part 5 is at one side configured for optical connection with the light entry part 2 and at an opposite side configured to be in optical connection with the light exit part 3. The light transmitting part 5 is preferably axi-symmetric with respect to the longitudinal axis 6c, and is preferably a tubular light transmitting part. The light transmitting part 5 can for example be a solid body using total internal reflection for transmitting the light towards the light exit part 3. The light exit part 3 comprises at least one lens, in this case three lenses 7a, 7b, 7c, to mainly output the light along a direction of the central axis 6 and at least two reflecting surfaces 8a, 8b to mainly output the light sideways in a direction transverse to a plane including the central axis 6. The reflecting surfaces 8a, 8b are arranged on either side of the plane and with the lenses 7a, 7b, 7c arranged substantially in between the at least two reflecting surfaces 8a, 8b. The lenses can form an end of the optical element 1, with the reflecting surfaces 8a, 8b being positioned deeper than the lenses 7a, 7b, 7c, as seen head on the light exit part 3. The light entry part 2 of the optical element 1 of FIG. 1 comprises positioning elements 9 for fixating the at least one light emitting element 13 with respect to the optical element 1. The at least one light emitting element 13 may be an LED positioned on a printed circuit board 10 as mounting plate. The printed circuit board 10 may comprise cooperating elements 11 that cooperate with the positioning elements 9 as to precisely position and align the at least one light emitting element 13 with respect to the light entry part 2. Instead of a single light emitting element 13, also multiple light emitting elements positioned in an array, a matrix or any other pattern on the printed circuit board 10 may be used.

As can be seen in FIG. 2, showing a perspective bottom view of the optical element of FIG. 1 but without a dome 4 or printed circuit board 10, the light entry part 2 can comprise mounting elements 14 for mounting the optical element 1 to a mounting fixture (not shown). For example, the mounting element 14 may be a ring or a flange surrounding the light entry part 2. In the embodiment shown in FIG. 1, the mounting element 14 is a flange extending outwardly and surrounding the light entry part 2. An edge of the flange can include one or more recesses 15. The flange can also include one or more holes 16. The mounting elements 14 may also be combined with the positioning elements 9. The light transmitting part 5 can optionally include one or more guiding elements 17 configured to cooperate with corresponding guiding elements on the mounting fixture, which can help to correctly orient the optical element 1. The light entry part 2 can further comprise a recess 18 for housing the at least one light emitting element 13. The recess 18 can form a light entry surface 18a for receiving light emitted by the at least one light emitting element 13. The optical element 1 as shown in FIG. 2, is preferably manufactured as a single piece by means of injection molding, for example in plastic, thus avoiding refraction problems at interfaces between different pieces. However, if this reveals to be difficult due to the solidity of the piece, the optical element 1 can also be manufactured by means of injection molding in at least two pieces, which may be glued to each other, or optically connected in another way.

FIG. 3 shows a schematic representation of light rays in the light entry part 2 of the optical element 1 of FIG. 1. The light entry part 2 can comprise a collimator 19 arranged as a body of revolution around the central axis 6. The collimator 19 can for example use total internal reflection to reflect and/or direct light coming from the at least one light emitting element (not shown in FIG. 3) into a direction substantially in parallel with the central axis 6. Other types of collimators which can direct incoming light in a substantially parallel way into the light transmitting part 5 can be used, as will be clear to the person skilled in the art.

FIGS. 4a, 4b and 4c show more details of the light exit part 3, FIG. 4a showing a perspective front view of the light exit part 3, FIG. 4b showing a schematic side view of the light exit part 3, and FIG. 4c showing in particular a schematic top view of the light exit part 3 of the optical element 1 of FIG. 1. The optical element of FIG. 4a is shown in the position as it is positioned in use. The plane including the central axis 6 is a symmetry plane P, with respect to which the at least two reflecting surfaces 8a, 8b are arranged symmetrically. The symmetry plane P is, in use, a substantially vertical plane, as can be seen in FIG. 4a. The light exit part 3 can comprise a matrix pattern of lenses arranged symmetrically with respect to the plane including the central axis, preferably with respect to the symmetry plane P. The matrix pattern may comprise n positions, for example nine positions as in this embodiment, of which m positions are filled with a lens, for example seven, such that the pattern of filled positions is symmetric with respect to the plane including the central axis, preferably with respect to the symmetry plane P. In the present embodiment, the light exit part 3 includes a central array of three lenses 7a, 7b, 7c, of which the main optical axis are included in the symmetry plane P. On top of these three lenses, the light exit part 3 further includes four more lenses 7d, 7e, 7f and 7g, which are positioned on the four corners of an imaginary 3×3 matrix pattern. The remaining positions of the 3×3 matrix are not filled with lenses, but rather with the reflecting surfaces 8a, 8b. Other matrix patterns are possible as well, and depend on the desired light output pattern of the light exit part 3, for example a 3×3 matrix in which there is only one central lens instead of an array of lenses 7a, 7b, 7c, or a 3×3 matrix in which there are six reflecting surfaces on the sides and three lenses in a central array, or a 3×1 matrix with a central lens flanked by two reflecting surfaces, or any other matrix pattern filled with at least lens and at least two reflecting surfaces. Thus, in this embodiment, the light exit part 3 is configured to output light in a predefined pattern symmetric with respect to the plane including the central axis, preferably with respect to the symmetry plane P. The desired light output pattern includes a horizontal beam spread comprised in a range of approximately 60°-200° with a beam which is symmetrical with respect to the symmetry plane P. However, depending on the desired light output pattern, the central array of lenses 7a, 7b, 7c are preferably not arranged symmetrically with respect to a second plane including the central axis 6 and transverse to the symmetry plane P, which second plane is substantially horizontal in use. As shown in the side view in FIG. 4b, the light exit part 3, and in particular the central array of lenses 7a, 7b, 7c, may be configured to emit light with a limited and asymmetrical vertical beam spread in a range of approximately 0.1°— approximately 15°, directing more light upwardly than downwardly in use, for example in a range of approximately −2° to approximately +10° with respect to a substantially horizontal plane. The bottom view of FIG. 4c shows how the reflecting surfaces 8a, 8b are positioned with the reflecting surfaces facing sidewards, away from each other and away from the central array of lenses 7a, 7b, 7c arranged in between the reflecting surfaces 8a, 8b. The reflecting surfaces 8a, 8b are preferably parabolic surfaces, but may also have any other shape known to the person skilled in the art. The bottom view also shows the symmetry of the light exit part 3 with respect to the symmetry plane P, transverse to the plane of the figure, whereas the lenses 7a, 7d and 7e protrude more than the lens 7b or still more than the lenses 7f, 7g and 7c. The reflecting surfaces 8a, 8b are positioned deeper than the central array of lenses 7a, 7b, 7c, or even than all the lenses 7a-g.

FIG. 5 shows a schematic representation in top view of light rays 20 in the light exit part 3. In the top view of FIG. 5, it can be seen that light coming from the light transmitting part 5 is separated: part of the light is reflected sidewards on the reflecting surfaces 8a, 8b, while the rest of the light exits the light exit part 3 via the lenses 7a-g which are configured to direct the light in a substantially horizontal beam around the central axis 6. The entire desired horizontal beam spread of up to approximately 200° can be reached in a substantially well distributed way by the combination of the different elements of the light exit part 3, i.e. the lenses 7a-g and the reflecting surfaces 8a, 8b. The lenses 7d, 7e, 7f and 7g are arranged to direct light to a zone filling the angle between light coming from the central array of lenses 7a, 7b, 7c and from the reflecting surfaces 8a, 8b.

FIG. 6 shows a schematic representation in side view of light rays 20 in the light exit part 3. The side view shows the desired limited vertical beam spread of the optical element 1, which is comprised in a range of approximately 10°-15°. Especially the central array of lenses can be arranged such that the vertical beam spread is an asymmetrical beam spread with respect to a substantially horizontal plane in use including the central axis 6, with more light being directed upwardly than downwardly in use.

For the purpose of clarity and a concise description, features are described herein as part of the same or separate embodiments, however, it will be appreciated that the scope of the invention may include embodiments having combinations of all or some of the features described. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain features are recited does not indicate that a combination of these features cannot be used to an advantage. Many variants will be apparent to the person skilled in the art. All variants are understood to be comprised within the scope of the invention as defined by the following claims.

The invention claimed is:

1. An obstacle lighting optical element comprising:
a light entry part for receiving light from at least one light emitting element and having a central axis;
a light exit part for outputting light along the central axis, the central axis for the light entry part and the central axis for the light exit part being collinear;
a longitudinally extending light transmitting part having a longitudinal axis, wherein the light transmitting part extends between the light entry part and the light exit part, such that the central axes of the light entry part and of the light exit part coincide with the longitudinal axis of the light transmitting part; wherein the light transmitting part is at one side configured for optical connection with the light entry part and at an opposite side configured to be in optical connection with the light exit part;
wherein the light exit part comprises at least one lens to substantially output the light along a direction of the central axes and at least two reflecting surfaces to substantially output the light sideways in a direction transverse to a plane including the central axes, wherein the at least two reflecting surfaces are arranged on either side of the plane and with the at least one lens arranged substantially in between the at least two reflecting surfaces relative to said plane,
wherein, relative to the central axes, the at least one lens of the light exit part forms an outermost end of the optical element, and wherein the at least two reflecting surfaces are positioned deeper towards the light entry part as compared to the at least one lens that forms the outermost end in a direction along the central axes.

2. The optical element according to claim 1, wherein the light entry part comprises a collimator arranged as a body of revolution around the central axes.

3. The optical element according to claim 1, wherein the light entry part comprises a recess for housing the at least one light emitting element, wherein the recess forms a light entry surface for receiving light emitted by the at least one light emitting element.

4. The optical element according to claim 1, wherein the light transmitting part is axi-symmetric with respect to the longitudinal axis.

5. The optical element according to claim 1, wherein the light transmitting part is a solid body using total internal reflection for transmitting the light towards the light exit part.

6. The optical element according to claim 1, wherein the plane including the central axes is a symmetry plane, with respect to which the at least two reflecting surfaces are arranged symmetrically, and which the symmetry plane is, in use, a substantially vertical plane.

7. The optical element according to claim 6, wherein the reflecting surfaces are inclined with respect to the symmetry plane.

8. The optical element according to claim 1, wherein the light exit part is configured to output light in a predefined pattern symmetric with respect to the plane including the central axes.

9. The optical element according to claim 1, wherein the light exit part comprises at least two lenses arranged substantially in between the at least two reflecting surfaces, and wherein a main optical axis of the at least two lenses are arranged in the plane including the central axes.

10. The optical element according to claim 1, wherein the light exit part comprises a matrix pattern of lenses and/or reflecting surfaces arranged symmetrically with respect to the plane including the central axes.

11. The optical element according to claim 10, wherein the matrix pattern may comprise n positions, of which m positions are filled with a lens, wherein m<n, such that the pattern of filled positions is symmetric with respect to the plane including the central axis.

12. The optical element according to claim 1, further comprising a transparent dome configured to be mounted over the light exit part.

13. The optical element according to claim 1, wherein the at least two reflecting surfaces are at a distance from each other with the at least one lens in between.

14. The optical element according to claim 1, wherein the at least one lens is enclosed by the reflecting surfaces, such that the at least one lens is in between the reflecting surfaces that are symmetrically positioned with respect to the at least one lens.

15. The optical element according to claim 1, wherein the light transmitting part is a tubular light transmitting part, and wherein the at least two reflecting surfaces are positioned within a circumference of said light transmitting part.

16. Optical element for use through a wall of a wind turbine comprising:
a light entry part for receiving light from at least one light emitting element and having a central axis;
a light exit part for outputting light along the central axis shared with the light entry part;
a longitudinally extending light transmitting part having a longitudinal axis, wherein the light transmitting part extends between the light entry part and the light exit part, such that the central axes of the light entry part and of the light exit part coincide with the longitudinal axis of the light transmitting part; wherein the light transmitting part is at one side configured for optical connection with the light entry part and at an opposite side configured to be in optical connection with the light exit part;
wherein the light exit part comprises multiple lenses to substantially output the light along a direction of the central axes and at least two reflecting surfaces to substantially output the light sideways in a direction transverse to a plane including the central axes, wherein the reflecting surfaces are arranged on either side of the plane and with the multiple lenses arranged in between the at least two reflecting surfaces relative to said plane, such that the reflecting surfaces are spaced apart from each other,
wherein, relative to the central axes, the multiple lenses of the light exit part are provided on an outermost end of the optical element, and wherein the at least two reflecting surfaces are positioned deeper towards the light entry part as compared to the multiple lenses that form the outermost end in a direction along the central axes.

17. The optical element of claim 16, wherein the reflecting surfaces do not contact each other.

18. The optical element of claim 16, wherein the reflecting surfaces are inclined with respect to the central axes.

19. The optical element of claim 16, wherein the reflecting surfaces are inclined such that a distance between the reflecting surfaces increases along the output direction of the central axes.

20. The optical element of claim 16, wherein the multiple lenses are arranged between the reflecting surfaces and extend, in axial direction of the optical element, beyond the reflecting surfaces.

21. An optical element comprising:
a light entry part for receiving light from at least one light emitting element and having a central axis;
a light exit part for outputting light along the central axis;
a longitudinally extending light transmitting part having a longitudinal axis, wherein the light transmitting part extends between the light entry part and the light exit part, such that the central axes of the light entry part and of the light exit part coincide with the longitudinal axis of the light transmitting part; wherein the light transmitting part is at one side configured for optical connection with the light entry part and at an opposite side configured to be in optical connection with the light exit part;
wherein the light exit part comprises a central array of lenses to substantially output the light along a direction of the central axes and at least two reflecting surfaces at both sides of the central array to substantially output the light sideways in a direction transverse to a plane including the central axes, wherein the at least two reflecting surfaces are arranged on either side of the plane and with the central array of lenses arranged substantially in between the at least two reflecting surfaces relative to said plane,
wherein, relative to the central axes, the central array of lenses of the light exit part are positioned transversely thereto and forms an outermost end of the optical element, and wherein the at least two reflecting surfaces are positioned deeper towards the light entry part as compared to the central array of lenses that forms the outermost end in a direction along the central axes.

22. An optical element comprising:
a light entry part for receiving light from at least one light emitting element and having a central axis;
a light exit part for outputting light along the central axis;
a longitudinally extending light transmitting part having a longitudinal axis, wherein the light transmitting part extends between the light entry part and the light exit part, such that the central axes of the light entry part and of the light exit part coincide with the longitudinal axis of the light transmitting part; wherein the light transmitting part is at one side configured for optical connection with the light entry part and at an opposite side configured to be in optical connection with the light exit part;
wherein the light exit part comprises an array of lenses to substantially output the light along a direction of the central axes and at least two reflecting surfaces to substantially output the light sideways in a direction transverse to a plane including the central axes, wherein the at least two reflecting surfaces are arranged symmetrically on either side of the plane and with the array of lenses arranged symmetrically and substantially in between the at least two reflecting surfaces relative to said plane and the at least two reflecting surfaces are positioned facing away from each other and away from the array of lenses arranged therebetween,
wherein, relative to the central axes, the array of lenses of the light exit part forms an outermost end of the optical element, and wherein the at least two reflecting surfaces are positioned deeper towards the light entry part as compared to the array of lenses that forms the outermost end in a direction along the central axes, wherein at least one lens of the array of lenses protrudes more than other lenses of the array.

23. The optical element according to claim 22, wherein the light exit part comprises an additional set of lenses arranged to direct light to a zone filling an angle between light coming from the array of lenses and from the reflecting surfaces, and wherein the reflecting surfaces are positioned deeper towards the light entry part than both the array of lenses and the additional set of lenses.

24. The optical element according to claim 23, wherein the additional set of lenses comprises lenses provided on either side of the central array and the central axis.

* * * * *